J. O. JOYCE.
LIFTING-JACK.
No. 172,925. Patented Feb. 1, 1876.
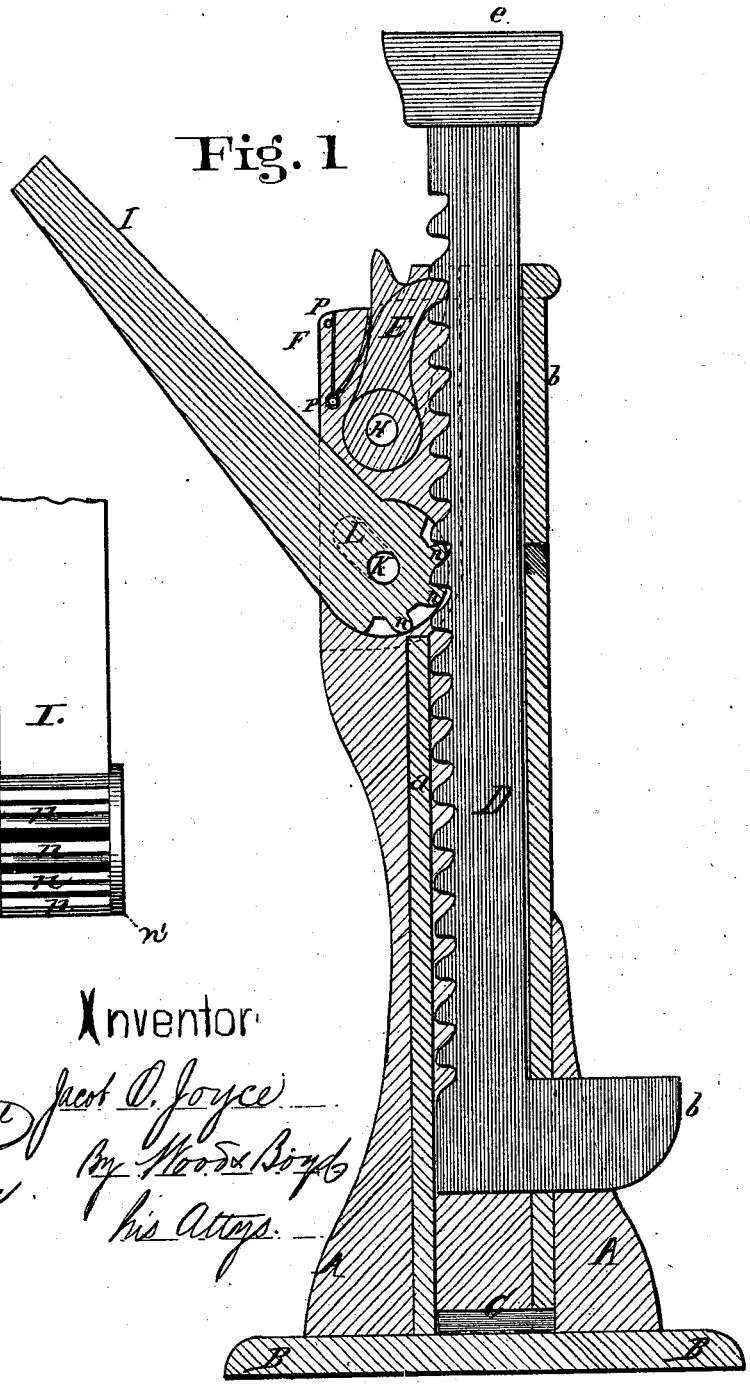
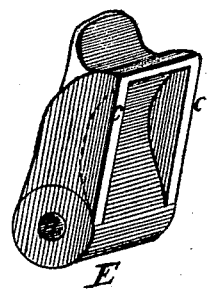
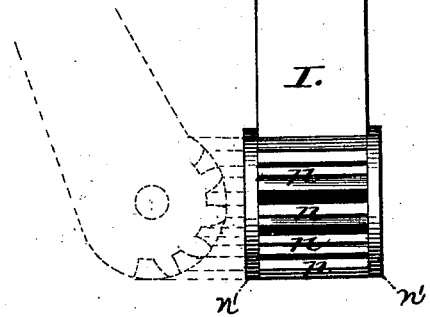
Attest  Inventor

UNITED STATES PATENT OFFICE.

JACOB O. JOYCE, OF DAYTON, OHIO.

IMPROVEMENT IN LIFTING-JACKS.

Specification forming part of Letters Patent No. 172,925, dated February 1, 1876; application filed July 30, 1875.

*To all whom it may concern:*

Be it known that I, JACOB O. JOYCE, of Dayton, in the county of Montgomery and State of Ohio, have invented certain new and useful Improvements in Lifting-Jacks, of which the following is a specification:

My invention consists in the method of constructing the pawl, which will be fully explained in the following description and annexed drawings, making a part of this specification.

Figure 1 represents a sectional view of my improvement, taken vertically through the center. Fig. 2 is a perspective view of the pawl E in Fig. 1. Fig. 3 represents a side and end view of the lever.

A represents one of the two like sides of the frame of my jack; B, the base or bottom; a, the front part of the frame; and b the back part of said frame. This frame is usually made of iron cast in one piece.

C represents a soft elastic cushion, india-rubber being preferred. D represents the rack-bar; E, the cap or top part of the same; and d the foot or bottom lever. I represents a lever with ratchet-teeth n upon the shorter end, which are so constructed and shaped that two teeth are always partly in contact with the teeth of the bar D, having on each the flanges n' n', which, when the lever is in place, grasp the sides of the rack-bar and retain the same in firm and steady position. K is a pin or journal attached to lever I, and connecting it to frame A by projecting laterally upon each side thereof far enough to furnish two journals which turn on their bearings, formed by the lower part of the slots L in the frame A. E is a pawl, with two flanges, e e, upon each side to strengthen it. These flanges lie each side of the rack-bar D when the pawl E engages one of the teeth, which pass on opposite sides of the rack-bar, and, together with the lever, assist in making the rack-bar work steady and even. F represents a gun-lock spring attached to the frame of the jack by the pivot P passing through the eye upon the lower end of said spring. P' is a pin or stop which holds the top of the spring in position. This spring serves to keep pawl E in contact with bar D. When the pawl is disengaged the lever I sustains the bar D and its weight.

The shape of slots L is such that the weight lifted by bar D, and the force applied to the longer end of I to raise the weight, both operate to force the journal or pin K into the lower side of said slots. After the weight has been raised as high as a single turn or throw of the lever will allow, it can be disengaged for a second lift by raising the lever and drawing it upward, the pin K sliding in slots L until the teeth n are disengaged from the teeth of rack-bar D, and the lever I can be applied at any desired point of contact with D.

This method of attaching the lever to the frame of the jack, and the mode of connecting and disengaging it with the ratchet-bar, is superior to any method hitherto used. As two teeth of the lever are most of the time in mesh with those of the rack-bar, there is less chance for the slipping of the lever, as one tooth leaves before the second has fairly engaged with the bar, a positive lift being secured.

The pawl which sustains the rack D with the weight to be lifted is of superior construction, and can be made strong enough to sustain any desired weight.

Having described my invention, what I claim as new is—

The pawl E, having the side flanges e e, in combination with the frame A, rack-bar D, and lever I, all arranged to operate substantially as described.

In testimony whereof I have hereunto set my hand this 31st day of March, 1873.

JACOB O. JOYCE.

Witnesses:
O. M. GOTTSCHALL,
GEO. M. YOUNG.